Aug. 11, 1959
R. SHILLIN
2,898,700
FISH LURE
Filed April 1, 1954
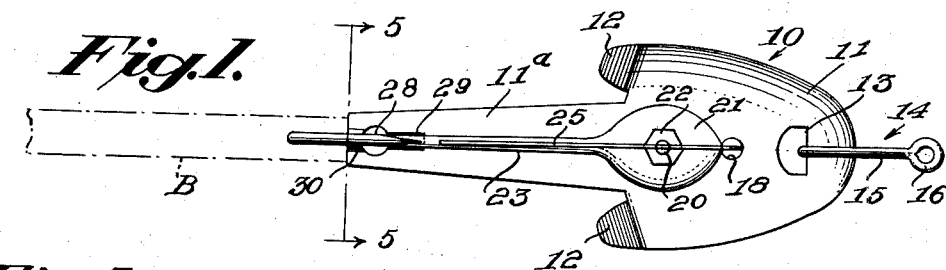
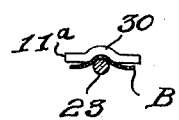
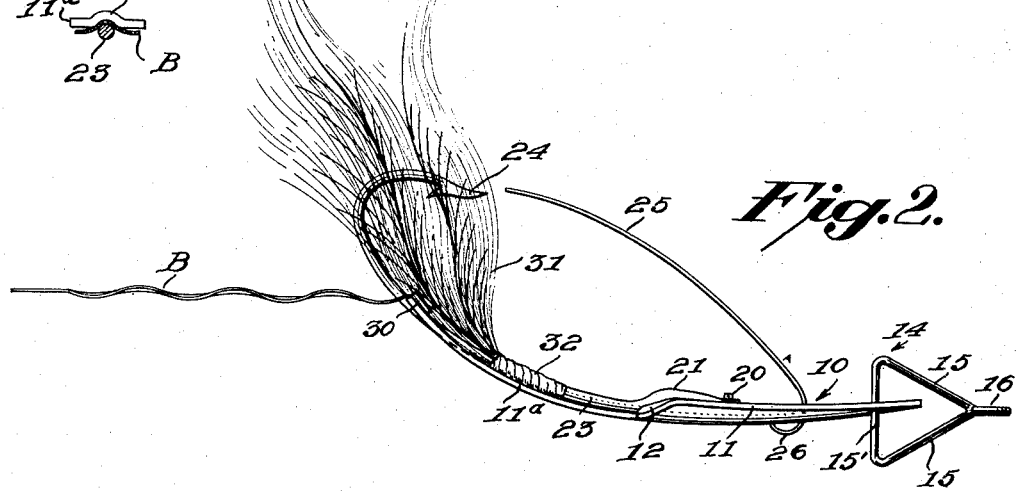
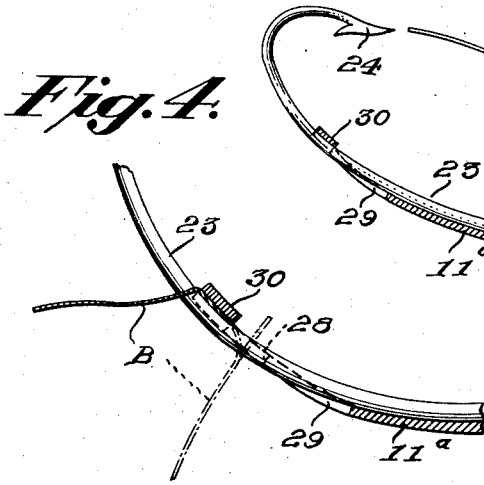
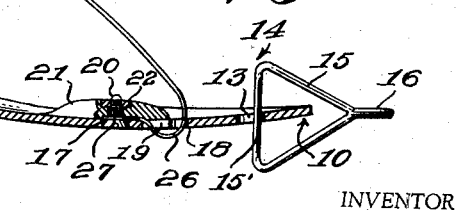
INVENTOR
Rudolph Shillin.
BY
ATTORNEY United States Patent Office 2,898,700
Patented Aug. 11, 1959

2,898,700

FISH LURE

Rudolph Shillin, Washington, D.C.

Application April 1, 1954, Serial No. 420,290

2 Claims. (Cl. 43—42.29)

This invention relates to a fish lure.

One object of the invention is to provide a novel automatic trailing bait clamp between the hook shank and the rear end of the spoon.

Other objects and advantages of the invention will become apparent in the course of the following detailed description, taken in connection with the accompanying drawing, wherein:

Fig. 1 is a top plan view of the improved lure with the feathers omitted for greater clarity of illustration.

Fig. 2 is a side elevational view of the lure, the feathers being included.

Fig. 3 is a longitudinal central vertical sectional view with the feathers omitted.

Fig. 4 is an enlarged fragmental longitudinal vertical section particularly illustrating the operation of the trailing bait clamp.

Fig. 5 is a partial transverse vertical sectional view as observed substantially in the plane of line 5—5 on Fig. 1 and showing in particular the trailing bait clamp.

Referring now in detail to the drawing, wherein the invention is illustrated in accordance with a preferred embodiment thereof, the improved lure comprises a spoon 10 whose forward major portion 11 is downwardly dished and the margin of such portion is defined by a forward curve and side curves of greater radius than the forward curve.

The spoon further embodies a tail portion 11$^a$ which is upwardly and rearwardly curved from the forward major portion and the center line of the tail portion 11$^a$ coincides with the longitudinal center line of the forward major portion 11. The forward major portion 11 terminates rearwardly in a pair of fins 12 at each side of the tail portion 11$^a$.

The major portion 11 is provided with a transversely elongated slot 13 and a line connector 14 of generally triangular form including opposed angular sides 15 and a side 15$^1$ has the latter extended through the slot 13. The connector further includes a line attaching eye 16 at the forward end thereof. The forward spoon portion 11 is provided with an aperture 17 in the longitudinal center line of the spoon and such portion is further provided with an aperture 18 and a slot 19 projecting rearwardly therefrom in said center line.

The slot 13 has a straight front edge which provides for easier and smoother movement of the connector 14, transversely of the spoon.

A screw 20 is extended through the aperture 17 and through a weight mass 21 which is removably retained in engagement with the spoon by means of a nut 22.

An elongated hook shank 23 is attached to the weight mass 21 and is supported for the major portion of its length on the spoon tail portion 11$^a$. The hook shank 23 terminates in a barb 24 disposed above the end of the spoon tail portion 11$^a$.

A weed guard 25 is provided and the same embodies a relatively light gauge wire whose major portion is disposed above the hook shank 23 and curved oppositely thereto and the free end of the guard terminates closely adjacent the hook barb 24.

Means are provided for removably securing the guard in operative position and such means comprises a bend 26 adjacent the forward end of the guard and which end is in the form of an eye 27 which rests upon the spoon portion 11 beneath the weight mass 21 and through which the screw 20 extends.

The aperture 18 and slot 19 provide for passage of the bend 26 and eye 27 in the assembly and disassembly of the guard.

The spoon tail portion 11$^a$ is provided with an aperture 28 adjacent its free end and such portion is further provided with an elongated slot 29 whose rear end opens into the aperture 28.

The portion 11$^a$ is upwardly offset at 30 between said aperture 28 and the rear end of the spoon to cooperate with the hook shank 23 to provide a clamp for a trailing bait B which may preferably be a relatively long and relatively narrow strip of pork rind.

In the application of the trailing bait B, one end thereof is forced over the hook barb 24 and drawn downwardly along the hook shank 23 and between the same and the upwardly offset portion 30 as will be apparent from the dotted line position in Fig. 4. With the bait in such position it is then drawn rearwardly whereby the end portion is drawn between the hook shank 23 and the offset portion 30 as indicated in full lines in Fig. 4, which elements form a clamp to retain the trailing bait from riding up on the shank of the hook adjacent the barb.

It is to be observed at this point that the slot 29 is provided to position the hook shank 23 in close operative relation to the portion 30 to provide the clamp structure as above described.

The novel clamp structure provides means for attaching an artificial flexible bait in the form of a strip of cloth or pork rind so that the end of the bait is attached between the hook shank and the end of the spoon in such a way that the strip of cloth or pork rind becomes a straight line extension of the spoon as opposed to a connection in which the pork rind is pivotally retained on the hook as by an aperture in the pork rind through which the hook projects.

Preferably a feather or feathers 31 are secured to the hook shank 23 by suitable wrapping 32 and such feathers are in a position to substantially conceal the needle barb 24.

Having set forth the construction of the improved lure, the operation thereof is as follows:

With a line attached to the eye 16 of the connector 14, the straight side 15$^1$ of the connector and the straight sided elongated slot 13 permit a rapid side-to-side transition of the bearing point of the connector on the spoon, thus permitting the spoon first to follow a side-to-side motion which is of value in attracting fish, and, secondly, causing sounds which causes some fish to strike the lure. Such sounds are caused by the front edge of the spoon striking the sloping sides of the connector while it oscillates back and forth and by the slapping of the connector against the spoon during its oscillation. The sounds thus produced will vary both in tone and pitch, depending largely upon the material used in the construction of the connector.

The specific disposition of the weight mass 21 and its relation to the fins 12 provides for a stronger pendulum action than would be obtained by an unweighted spoon. The spoon in action swings in an arc and the effect of water pressure on the inside surface of one fin and on the outside surface of the opposite fin acts to widen such arc.

This swinging or pendulum action is desired to provide a force in overcoming the resistance of the fins to the transverse swing of the spoon about its longitudinal axis.

The trailing bait clamp above fully described, provides for attachment of the bait in a minimum of time and with the expenditure of minimum effort.

While I have disclosed my invention in accordance with a single specific structural embodiment thereof, such is to be considered as illustrative only, and not restrictive, the scope of the invention being defined in the sub-joined claims.

What I claim and desire to secure by U.S. Letters Patent is:

1. A fish lure comprising an elongated spoon and a hook having an elongated shank supported on the spoon so that said shank is biased toward one surface of the spoon, said spoon having a longitudinal slot adjacent the rear end thereof, a portion of the shank passing through said slot whereby a trailing bait may be placed partially within the slot and be clamped therein by said biased shank.

2. The lure according to claim 1, wherein the rear end portion of the spoon between the rear end of the slot and the rear edge of the spoon comprises a portion which extends away from said surface, said portion being channel-shaped and adapted to receive a portion of said hook shank in order to clamp said trailing bait therebetween.

References Cited in the file of this patent

UNITED STATES PATENTS

| | | |
|---|---|---|
| Re. 15,204 | Dubrow | Oct. 11, 1921 |
| D. 93,800 | Sylvan | Nov. 6, 1934 |
| D. 139,655 | Jorgensen | Dec. 5, 1944 |
| D. 158,846 | Fisher | June 6, 1950 |
| 1,575,139 | Wiesenfeld | Mar. 2, 1926 |
| 1,615,963 | Stanley | Feb. 1, 1927 |
| 1,638,215 | Rodgers | Aug. 9, 1927 |
| 1,862,917 | Anderson | June 14, 1932 |
| 1,890,400 | Miller | Dec. 6, 1932 |
| 1,928,367 | Buddle | Sept. 26, 1933 |
| 2,145,283 | Accetta | Jan. 31, 1939 |
| 2,167,163 | Toepper | July 25, 1939 |
| 2,168,894 | Arbogast | Aug. 8, 1939 |
| 2,423,615 | Pecher | July 8, 1947 |
| 2,586,186 | Swanberg | Feb. 19, 1952 |
| 2,619,764 | Mellin | Dec. 2, 1952 |